(12) United States Patent
Kim et al.

(10) Patent No.: US 10,961,390 B2
(45) Date of Patent: Mar. 30, 2021

(54) BINDER COMPOSITION, ARTICLE, AND METHOD FOR MANUFACTURING ARTICLE

(71) Applicant: CJ CHEILJEDANG CORPORATION, Seoul (KR)

(72) Inventors: Ji Eun Kim, Gunpo-si (KR); Chang Suk Lee, Yongin-si (KR); Jun Ok Moon, Yongin-si (KR); Young Lyeol Yang, Seoul (KR); Chang Yub Oh, Yongin-si (KR); Hang Duk Roh, Hwaseong-si (KR); Do Yong Sim, Seoul (KR); Kwang Myung Cho, Seongnam-si (KR); Jin Woo Choi, Yongin-si (KR)

(73) Assignee: CJ CHEILJEDANG CORPORATION, Seoul (KR)

(*) Notice: Subject to any disclaimer, the term of this patent is extended or adjusted under 35 U.S.C. 154(b) by 0 days.

(21) Appl. No.: 16/604,988

(22) PCT Filed: Apr. 13, 2018

(86) PCT No.: PCT/KR2018/004308
§ 371 (c)(1),
(2) Date: Oct. 14, 2019

(87) PCT Pub. No.: WO2018/190662
PCT Pub. Date: Oct. 18, 2018

(65) Prior Publication Data
US 2020/0157344 A1 May 21, 2020

(30) Foreign Application Priority Data

Apr. 13, 2017 (KR) .......... 10-2017-0048032
Jan. 22, 2018 (KR) .......... 10-2018-0007895

(51) Int. Cl.
*C08L 77/04* (2006.01)
*C08K 5/053* (2006.01)
*C08K 5/1545* (2006.01)
*C08K 7/02* (2006.01)

(52) U.S. Cl.
CPC ............ *C08L 77/04* (2013.01); *C08K 5/1545* (2013.01); *C08K 7/02* (2013.01)

(58) Field of Classification Search
CPC ........ C08L 77/04; C08K 5/1545; C08K 5/053
See application file for complete search history.

(56) References Cited

U.S. PATENT DOCUMENTS

| | | | |
|---|---|---|---|
| 9,492,943 B2 | 11/2016 | Hand et al. | |
| 9,828,287 B2 * | 11/2017 | Swift | C03C 25/26 |
| 2007/0027283 A1 * | 2/2007 | Swift | C03C 17/28 527/312 |
| 2007/0123680 A1 * | 5/2007 | Swift | E04B 1/84 527/312 |
| 2007/0142596 A1 * | 6/2007 | Swift | F16L 59/026 527/312 |
| 2010/0087571 A1 * | 4/2010 | Jackson | C08L 97/02 524/13 |
| 2011/0135937 A1 * | 6/2011 | Swift | C03C 25/14 428/426 |
| 2011/0220835 A1 * | 9/2011 | Swift | C03C 17/28 252/62 |
| 2011/0262648 A1 * | 10/2011 | Lee | C09J 179/02 427/372.2 |
| 2011/0263757 A1 | 10/2011 | Rand et al. | |
| 2012/0135152 A1 | 5/2012 | Finch et al. | |
| 2012/0208935 A1 * | 8/2012 | Tutin | C08L 61/14 524/47 |
| 2013/0234362 A1 * | 9/2013 | Swift | C03C 17/28 264/257 |
| 2013/0236650 A1 * | 9/2013 | Swift | C09D 5/08 427/379 |
| 2013/0237113 A1 * | 9/2013 | Swift | C09D 105/00 442/410 |
| 2013/0244524 A1 * | 9/2013 | Swift | F16L 59/026 442/327 |
| 2013/0323493 A1 * | 12/2013 | Lee | C08K 5/17 428/221 |
| 2014/0001396 A1 * | 1/2014 | Tutin | D04H 3/004 252/62 |
| 2014/0116291 A1 * | 5/2014 | Jackson | C08L 97/02 106/164.01 |
| 2015/0152266 A1 * | 6/2015 | Jackson | B27N 3/002 524/14 |
| 2015/0183959 A1 * | 7/2015 | Swift | C08K 7/14 106/162.2 |
| 2015/0224671 A1 | 8/2015 | Hand et al. | |
| 2015/0353765 A1 * | 12/2015 | Swift | C03C 25/321 524/845 |

(Continued)

FOREIGN PATENT DOCUMENTS

| | | |
|---|---|---|
| CA | 2954960 A1 | 1/2016 |
| JP | 2013525586 A | 6/2013 |

(Continued)

OTHER PUBLICATIONS

Moccia et al; "Synthesis of a l-lysine-based alternate alpha,epsilon-peptide: . . . nucleic acids-binding ability" International Journal of Pharmaceutics 397, 179-183 (Year: 2010).*

(Continued)

*Primary Examiner* — Karuna P Reddy
(74) *Attorney, Agent, or Firm* — Cantor Colburn LLP

(57) ABSTRACT

Provided is a binder composition including polylysine and at least one reducing sugar or a derivative thereof, wherein the polylysine has, in a $^1$H NMR spectrum thereof, a first peak at 3.2 ppm to 3.4 ppm and a second peak at 3.8 ppm to 4.0 ppm, wherein a ratio (A:B) of an area of the first peak (A) to an area of the second peak (B) is 70:30 to 98:2.

12 Claims, 2 Drawing Sheets

(56) References Cited

U.S. PATENT DOCUMENTS

| | | | | |
|---|---|---|---|---|
| 2016/0280950 | A1* | 9/2016 | Swift | B29C 70/68 |
| 2016/0355681 | A1* | 12/2016 | Jackson | C08L 97/02 |
| 2017/0174836 | A1* | 6/2017 | Hampson | C09J 179/02 |
| 2017/0190902 | A1* | 7/2017 | Swift | C08L 61/34 |
| 2019/0119446 | A1* | 4/2019 | Hampson | C08L 79/02 |

FOREIGN PATENT DOCUMENTS

| | | |
|---|---|---|
| KR | 1020150001799 A | 1/2015 |
| KR | 1020150113516 A | 10/2015 |
| KR | 1020170008825 A | 1/2017 |
| RU | 2015109065 A | 10/2016 |
| WO | 2011138459 A1 | 11/2011 |
| WO | 2013150123 A1 | 10/2013 |
| WO | 2015152607 A1 | 10/2015 |
| WO | 2015177114 A1 | 11/2015 |
| WO | 2016009062 A1 | 1/2016 |

OTHER PUBLICATIONS

Acceptance decision with search report dated Mar. 25, 2020 of Russian patent application No. 20191344540, which corresponds to the above-identified patent application.

English Translation of Acceptance decision with search report dated Mar. 25, 2020 of Russian patent application No. 20191344540, which corresponds to the above-identified patent application.

International Search Report dated Oct. 25, 2018 for PCT/KR2018/004308.

Korean Notice of Allowance (Grant of Patent, KIPO) dated Aug. 28, 2018 for Korean Application No. 10-2018-0007895 (full Korean text and full English translation).

Australian Government IP Examination report No. 1 for Standard patent application for AU 2018251522 dated Nov. 20, 2020.

Ho et al, "Ways of Selective Polycondensation of L-Lysine Towards Linear a-and e-Poly-L-Lysine", Journal of Polymer Science: Part A: Polymer Chemistry, vol. 46, 5053-5063, 2008.

Extended European Search Report dated Jan. 27, 2021 of European Patent application No. 18783720.8.

* cited by examiner

BINDER COMPOSITION, ARTICLE, AND METHOD FOR MANUFACTURING ARTICLE

TECHNICAL FIELD

The present disclosure relates to a binder composition including polylysine, an article cemented by a thermoset of the binder composition, and a method of manufacturing the article.

BACKGROUND ART

Articles such as non-woven fiber insulation and plywood are fabricated by shaping a mixture of a binder, such as a urea-formaldehyde resin (UF resin) or a phenol-formaldehyde resin (PF resin), and a base material, such as fiber or wood powder, and thermally curing the mixture. Conventional binders are obtained from fossil fuels and emit harmful volatile organic compounds (VOCs) such as formaldehyde in the binder manufacturing processes and even after the manufacture of articles. Therefore, research has been conducted on binders that provide excellent physical properties without the use of fossil fuels and the release of harmful substances.

DESCRIPTION OF EMBODIMENTS

Technical Problem

Provided is a naturally derived binder composition exhibiting excellent physical properties without the emission of harmful volatile organic compounds such as formaldehyde.

Solution to Problem

According to an aspect of the present disclosure, a binder composition includes: polylysine; and at least one reducing sugar or a derivative thereof, wherein the polylysine has, in a $^1$H NMR spectrum, a first peak at 3.2 ppm to 3.4 ppm and a second peak at 3.8 ppm to 4.0 ppm, wherein a ratio (A:B) of an area of the first peak (A) to an area of the second peak (B) is 70:30 to 98:2.

BEST MODE

Figure 1:
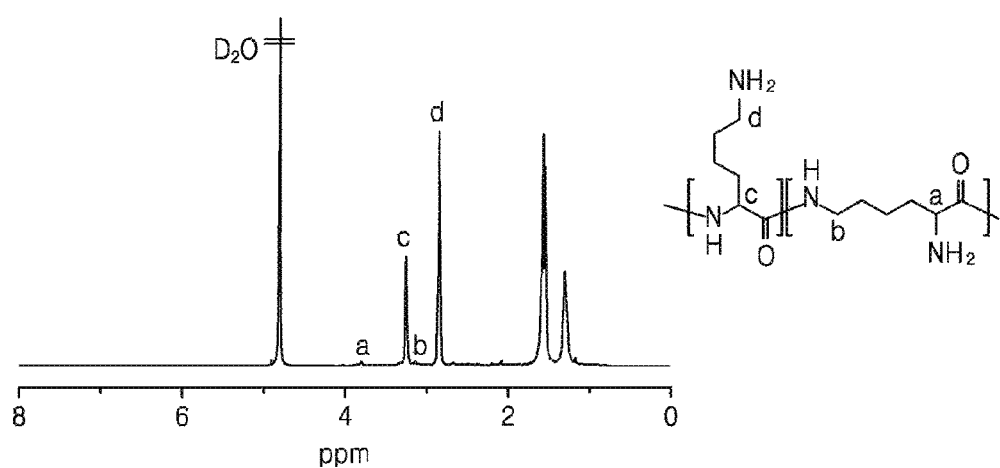
FIG. 1 shows a chemical structure of polylysine used in Example 1 and including both a lysine repeating unit in which an amino group linked to an α-position is used in polymerization and a repeating unit in which an amino group linked to an ε-position is used in polymerization; and $^1$H NMR spectrum thereof.

The inventive concept of the present disclosure described below allows for various changes and numerous embodiments, particular embodiments will be illustrated in the drawings and described in detail in the written description. However, this is not intended to limit the present disclosure to particular modes of practice, and it is to be appreciated that all modifications, equivalents, and substitutes that do not depart from the spirit and technical scope of the present disclosure are encompassed in the present disclosure.

The terms used herein are merely used to describe particular embodiments, and are not intended to limit the present disclosure. An expression used in the singular encompasses the expression of the plural, unless it has a clearly different meaning in the context. As used herein, it is to be understood that the terms such as "include", "have", or the like, are intended to indicate the existence of the features, numbers, operations, components, parts, elements, materials, or combinations thereof disclosed in the specification, and are not intended to preclude the possibility that one or more other features, numbers, operations, components, parts, elements, materials, or combinations thereof may exist or may be added. As used herein, the "I" may be interpreted as either "and" or "or" depending on situations.

Throughout the specification, it will be understood that, although the terms first, second, etc. may be used herein to describe various components, these components should not be limited by these terms. These terms are only used to distinguish one component from another.

Hereinafter, a binder composition according to an example embodiment will be described in more detail.

A binder composition according to an embodiment includes: polylysine; and at least one reducing sugar or a derivative thereof, wherein the polylysine has, in a $^1$H NMR spectrum, a first peak at 3.2 ppm to 3.4 ppm and a second peak at 3.8 ppm to 4.0 ppm, wherein a ratio (A:B) of an area of the first peak (A) to an area of the second peak (B) is 70:30 to 98:2. Thus, strength and water resistance of the water-insoluble polymer that is a thermoset of the binder composition may be improved. In addition, the binder composition and the thermoset thereof that is a water-insoluble polymer, may be environmentally friendly because they do not emit harmful volatile organic materials such as formamide. In a $^1$H NMR spectrum of polylysine, the ratio (A:B) of the area of the first peak (A) to the area of the second peak (B) may be 75:25 to 98:2, 80:20 to 98:2, 85:15 to 98:2, 90:10 to 98:2, or 95:5 to 98:2. Polylysine includes one type of polylysine or a mixture of two or more types of polylysine.

The content of polylysine may be 15 to 60 parts by weight, 25 to 60 parts by weight, 35 to 60 parts by weight, 40 to 60 parts by weight, 15 to 50 parts by weight, 25 to 50 parts by weight, 35 to 50 parts by weight, or 40 to 50 parts by weight based on 100 parts by weight of a solid content of the binder composition. When the content of polylysine is too low, an excess of unreacted residues of the reducing sugar may deteriorate physical properties of an article manufactured using the binder composition. When the content of polylysine is too high, the binder composition is incompletely cured, resulting in deterioration of physical properties of an article manufactured using the binder composition.

Particularly, the polylysine may be a condensation polymer of at least one selected from L-lysine and DL-lysine.

In particular, the polylysine may be L-polylysine polymerized using only L-lysine. Also, the polylysine may be DL-polylysine polymerized using only DL-lysine. Another example of polylysine may be polylysine polymerized using both L-lysine and DL-lysine as monomers.

In terms of water resistance, polylysine polymerized using only DL-lysine as a monomer may be more suitable than polylysine polymerized using only L-lysine as a monomer.

A molecular weight of polylysine may be 4,000 g/mol or more, 5,000 g/mol or more, 6,000 g/mol or more, 7,000 g/mol or more, 8,000 g/mol or more, 9,000 g/mol or more, or 10,000 g/mol or more.

For example, a molecular weight of polylysine may be 4,000 g/mol to 100,000 g/mol, 5,000 g/mol to 90,000 g/mol, 6,000 g/mol to 80,000 g/mol, 7,000 g/mol to 70,000 g/mol, 8,000 g/mol to 60,000 g/mol, 9,000 g/mol to 50,000 g/mol, or 10,000 g/mol to 50,000 g/mol. The molecular weight of polylysine may be measured by gel permeation chromatography (GPC) as a relative value to that of a PEG/PEO standard sample.

Polylysine may be a product obtained by condensation polymerization of lysine conducted for 6 to 48 hours at a temperature of 130 to 150° C.

Alpha ($\alpha$) in polylysine is a repeating unit in which an amino group linked to carbon at the $\alpha$-position of lysine is used in polymerization, and epsilon ($\varepsilon$) in the polylysine is a repeating unit in which an amino group linked to carbon at the $\varepsilon$-position of lysine is used in polymerization.

A composition ratio of alpha ($\alpha$):epsilon ($\varepsilon$) in polylysine is determined by a ratio of the area of the first peak (A) at 3.2 ppm to 3.4 ppm derived from a methine group (—CH) of the repeating unit in which the amino group linked to the $\alpha$-position is used in polymerization to the area of the second peak (B) at 3.8 ppm to 4.0 ppm derived from a methine group (—CH) of the repeating unit in which the amino group linked to the $\varepsilon$-position is used in polymerization in a $^1$H NMR spectrum of polylysine.

Meanwhile, the ratio (A:B) of the area of the first peak (A) to the area of the second peak (B) in a $^1$H NMR spectrum of polylysine may be adjusted by controlling conditions for condensation reaction of polylysine.

As the content of the repeating unit in which the amino group linked to the $\alpha$-position of lysine, i.e., $\alpha$-polylysine repeating unit, increases in polylysine, the area of the first peak (A) at 3.2 ppm to 3.4 ppm in a $^1$H NMR spectrum of polylysine may increase. Also, as the content of the repeating unit in which the amino group linked to the $\varepsilon$-position of lysine, i.e., $\varepsilon$-polylysine repeating unit, increases in polylysine, the area of the second peak (B) at 3.8 ppm to 4.0 ppm in a $^1$H NMR spectrum of polylysine may increase.

The reducing sugar or a derivative thereof may include at least one selected from an aldehyde group and a ketone group. Because the reducing sugar includes at least one selected from the aldehyde group and the ketone group, the aldehyde group and/or the ketone group may react with an amine group of polylysine to form an imine bond during thermal curing of the binder composition including the reducing sugar. In addition, such an imine bond may react with a hydroxyl group of another reducing sugar to be cured, and a mechanism of the curing may be an irreversible reaction.

A content of the reducing sugar or a derivative thereof may be 40 to 85 parts by weight, 40 to 75 parts by weight, 40 to 65 parts by weight, 40 to 60 parts by weight, 50 to 85 parts by weight, 50 to 75 parts by weight, 50 to 65 parts by weight, or 50 to 60 parts by weight based on 100 parts by weight of the solid content of the binder composition. When the content of the reducing sugar is too high, unreacted residues of the reducing sugar may deteriorate physical properties of an article manufactured using the binder composition. When the content of the reducing sugar is too low, the binder composition may be incompletely cured, resulting in deterioration of physical properties of the article manufactured using the binder composition.

The reducing sugar may be monosaccharides and disaccharides such as maltose, fructose, galactose, lactose, gentiobiose, rutinose, glucose, and xylose or any combination thereof, but is not necessarily limited thereto as long as the reducing sugar does not depart from the purpose of the present disclosure.

Particularly, for example, the reducing sugar may be glucose, xylose, or any combination thereof.

In addition, in terms of strength and water resistance, the reducing sugar may include glucose. In the binder composition, the solid content may be 15 to 80 parts by weight, 15 to 75 parts by weight, 15 to 70 parts by weight, 15 to 65 parts by weight, 15 to 60 parts by weight, or 15 to 55 parts by weight based on 100 parts by weight of the binder composition. In the binder composition, polylysine and reducing sugar are solids, and components other than the solids may be water as a diluent. When the solid content is too high, viscosity of the binder composition increases, resulting in deterioration of workability and a content of a binder may be excessively increased in an article manufactured using the binder composition. When the solid content is too low, excess energy may be consumed to remove water.

The binder composition may further include at least one additive. The additive may be, but is not limited to, a water repellent agent for enhancing water resistance of the thermoset, a rust inhibitor for preventing corrosion of the thermoset, a dustproof oil for reducing a dust generation ratio of the thermoset, a buffer for adjusting the pH of the thermoset, a coupling agent for improving adhesion of the binder composition and any other additive available in the art for improving physical properties of the binder composition and a thermoset thereof may also be used. A content of each of the additives may be 0.1 to 10 parts by weight, 0.1 to 8 parts by weight, 0.1 to 6 parts by weight, 0.1 to 5 parts by weight, 0.1 to 4 parts by weight, 0.1 to 3 parts by weight, 0.1 to 2 parts by weight, 0.1 to 1 parts by weight, or 0.1 to 0.5 parts by weight based on 100 parts by weight of a sum of polylysine and the reducing sugar, but the content is not necessarily limited thereto and may be adjusted according to required physical properties.

An article according to another embodiment of the present disclosure is cemented by the thermoset of the above-described binder composition. The thermoset of the above-described binder composition, as a water-insoluble polymer, strongly bonds the materials of the article together to improve strength and water resistance of the article.

The article cemented by the thermoset of the binder composition may have a water absorption thickness expansion rate, measured by a test method according to KSF3200, of 40% or less, 38% or less, 36% or less, 34% or less, 33% or less, 30% or less, 25% or less, 20% or less, 15% or less, or 12% or less. The article cemented by the thermoset of the binder composition may have excellent water resistance. In addition, the article cemented by the thermoset of the binder composition may have an internal bond strength, measured by a test method according to KSF3200, of 1.4 N/mm$^2$ or greater, 1.5 N/mm$^2$ or greater, 1.6 N/mm$^2$ or greater, 1.7 N/mm$^2$ or greater, 1.8 N/mm$^2$ or greater, 1.9 N/mm$^2$ or greater, or 2.0 N/mm$^2$ or greater. The article cemented by the thermoset of the binder composition may have excellent internal bond strength. The article cemented by the thermoset of the binder composition may be, but is not necessarily limited to, insulation or plywood, and any other articles cemented in a certain shape using the binder composition may also be used.

A method of manufacturing an article according to another embodiment of the present disclosure includes: preparing the above-described binder composition; and thermally curing the binder composition at a temperature of 120° C. or higher. The article manufactured by the above-described method has excellent water resistance and strength.

In the method of manufacturing an article, the binder composition may further include at least one selected from a fibrous material and a powdered material.

The fibrous material may be, but is not necessarily limited to, an aggregate of short fibers such as an inorganic fiber, e.g., rock wool, glass wool, and ceramic fiber, natural fiber, and fiber obtained from synthetic resin, and any other fibrous materials available in the art may also be used. The powdered material may be, but is necessarily not limited to, wood powder, and any other powdered materials available in the art may also be used.

As a mixture of the binder composition to which at least one of the fibrous material and the powdered material is further added is thermally cured at a temperature of 120° C. or higher, fibers or powders therein bind together by a thermoset of the binder composition. A heat treatment temperature for the thermal curing may be in the range of 120 to 300° C., 130 to 250° C., 140 to 200° C., or 150 to 180° C. When the heat treatment temperature is too low, the thermal curing may be incompletely performed. When the heat treatment temperature is too high, over curing may cause release of dust particles. A heat treatment time for the thermal curing may be 1 to 60 minutes, 5 to 40 minutes, 10 to 30 minutes, or 12 to 18 minutes. When the heat treatment time is too short, the thermal curing may be incompletely performed. When the heat treatment time is too long, over curing may cause release of dust particles. Because water-insoluble polymers are generated from the binder composition by thermal curing performed at a temperature of 120° C. higher via various curing reactions such as Maillard reaction between aldehyde groups/ketone groups of the reducing sugar and amine groups of polylysine, the binder composition may be used as an adhesive with excellent physical properties such as water resistance and strength.

Physical properties and a shape of a produced article may be adjusting by performing pressurizing and shaping simultaneously or sequentially during the thermal curing. Pressure or time applied during the pressurizing is not particularly limited and may be adjusted according to required density or the like of the article.

Mode of Disclosure

Hereinafter, the present disclosure will be described in more detail with reference to the following examples and comparative examples. However, these examples are made only for illustrative purposes, and the present disclosure is not be construed as being limited to those examples.

Example 1

3.42 g of L-polylysine produced by thermal condensation polymerization of L-lysine as a monomer at 150° C. for 48 hours and 3.42 g of glucose were dissolved in 38.86 g of distilled water to prepare a binder composition (solid content of 15 wt % and polylysine:glucose=1:1 w/w). 2 g of the binder composition was coated on filter paper located in a Moisture Balance and heated at 160° C. for 15 minutes. A brown water-insoluble polymer that is a thermoset of the binder composition was formed on the filter paper.

The polylysine used in the preparation of the binder composition had a number average molecular weight (Mn) of about 6,000 g/mol and a weight average molecular weight (Mw) of about 8,000 g/mol. As shown in a $^1$H NMR spectrum of FIG. 1, when 400 MHz NMR of polylysine was measured using deuterium oxide (D20) as a solvent, a ratio (A:B) of the area of the first peak (A) at 3.2 ppm to 3.4 ppm derived from a methine group (—CH, carbon c in FIG. 1) of the repeating unit in which the amino group linked to the α-position is used in polymerization to the area of the second peak (B) at 3.8 ppm to 4.0 ppm derived from a methine group (—CH, carbon a in FIG. 1) of the repeating unit in which the amino group linked to the ε-position is used in polymerization was 9:1. In FIG. 1, the first peak is shown as c and the second peak is shown as a.

A molecular weight of the polylysine was measured by gel permeation chromatography (GPC) using a PEG/PEO standard sample.

Example 2

A binder composition (solid content of 15 wt % and polylysine:glucose=1:3 w/w) was prepared in the same manner as in Example 1, except that 1.72 g of L-polylysine and 5.14 g of glucose were dissolved in 38.86 g of distilled water.

2 g of the binder composition was coated on filter paper located in a Moisture Balance and heated at 160° C. for 15 minutes. A brown water-insoluble polymer that is a thermoset of the binder composition was formed on the filter paper.

The polylysine used in the preparation of the binder composition had a ratio (A:B) of the area of the first peak (A) to the area of the second area (B) of 9:1 in the $^1$H NMR spectrum, a number average molecular weight (Mn) of about 6,000 g/mol, and a weight average molecular weight (Mw) of about 8,000 g/mol.

Example 3

A binder composition (solid content of 15 wt % and polylysine:glucose=1:5 w/w) was prepared in the same manner as in Example 1, except that 1.71 g of L-polylysine and 8.58 g of glucose were dissolved in 58.28 g of distilled water. 2 g of the binder composition was coated on filter paper located in a Moisture Balance and heated at 160° C. for 15 minutes. A brown water-insoluble polymer that is a thermoset of the binder composition was formed on the filter paper.

The polylysine used in the preparation of the binder composition had a ratio (A:B) of the area of the first peak (A) to the area of the second area (B) of 9:1 in the $^1$H NMR spectrum, a number average molecular weight (Mn) of about 6,000 g/mol, and a weight average molecular weight (Mw) of about 8,000 g/mol.

Example 4

A binder composition (solid content of 15 wt % and polylysine:glucose=1:10 w/w) was prepared in the same manner as in Example 1, except that 0.8 g of L-polylysine and 8 g of glucose were dissolved in 49.30 g of distilled water. 2 g of the binder composition was coated on filter paper located in a Moisture Balance and heated at 160° C. for 15 minutes. A brown water-insoluble polymer that is a thermoset of the binder composition was formed on the filter paper.

The polylysine used in the preparation of the binder composition had a ratio (A:B) of the area of the first peak (A) to the area of the second area (B) of 9:1 in the $^1$H NMR spectrum, a number average molecular weight (Mn) of about 6,000 g/mol, and a weight average molecular weight (Mw) of about 8,000 g/mol.

Example 5

A binder composition (solid content of 50 wt % and polylysine:glucose=1:1 w/w) was prepared in the same manner as in Example 1, except that 12.22 g of L-polylysine and 12.22 g of glucose were dissolved in 24.44 g of distilled water.

The polylysine used in the preparation of the binder composition had a ratio (A:B) of the area of the first peak (A) to the area of the second area (B) of 9:1 in the $^1$H NMR spectrum, a number average molecular weight (Mn) of about 6,000 g/mol, and a weight average molecular weight (Mw) of about 8,000 g/mol which are the same as those of Example 1.

Example 6

A binder composition (solid content of 50 wt % and polylysine:glucose=1:3 w/w) was prepared in the same manner as in Example 1, except that 6.11 g of L-polylysine and 18.33 g of glucose were dissolved in 20.5 g of distilled water.

The polylysine used in the preparation of the binder composition had a ratio (A:B) of the area of the first peak (A) to the area of the second area (B) of 9:1 in the $^1$H NMR spectrum, a number average molecular weight (Mn) of about 6,000 g/mol, and a weight average molecular weight (Mw) of about 8,000 g/mol which are the same as those of Example 1.

Example 7

A binder composition (solid content of 50 wt % and polylysine:glucose=1:0.5 w/w) was prepared in the same manner as in Example 1, except that 15.27 g of L-polylysine and 7.64 g of glucose were dissolved in 22.91 g of distilled water.

The polylysine used in the preparation of the binder composition had a ratio (A:B) of the area of the first peak (A) to the area of the second area (B) of 9:1 in the $^1$H NMR spectrum, a number average molecular weight (Mn) of about 6,000 g/mol, and a weight average molecular weight (Mw) of about 8,000 g/mol which are the same as those of Example 1.

Example 8

A binder composition (solid content of 50 wt % and polylysine:glucose=1:1 w/w) was prepared in the same manner as in Example 1, except that 14.14 g of polylysine and 14.14 g of glucose were dissolved in 28.28 g of distilled water, wherein the polylysine was a mixture of L-polylysine according to Example 1 and commercially available ε-polylysine (manufactured by Zhengzhou Bainafo Bioengineering Co., Ltd.).

The polylysine had a ratio (A:B) of the area of the first peak (A) to the area of the second area (B) of 7:3 in the $^1$H NMR spectrum, a number average molecular weight (Mn) of about 6,000 g/mol, and a weight average molecular weight (Mw) of about 8,000 g/mol.

Example 9

A binder composition (solid content of 50 wt % and polylysine:glucose=1:5 w/w) was prepared in the same manner as in Example 1, except that 30 g of L-polylysine and 150 g of glucose were dissolved in 360 g of distilled water and then stirred at 80° C. for one and a half hours.

The polylysine used in the preparation of the binder composition had a ratio (A:B) of the area of the first peak (A) to the area of the second area (B) of 9:1 in the $^1$H NMR spectrum, a number average molecular weight (Mn) of about 6,000 g/mol, and a weight average molecular weight (Mw) of about 8,000 g/mol which are the same as those of Example 1.

Example 10

A binder composition (solid content of 50 wt % and polylysine:xylose=1:5 w/w) was prepared in the same manner as in Example 1, except that 30 g of L-polylysine and 150 g of xylose were dissolved in 360 g of distilled water and then stirred at 80° C. for one and a half hours.

The polylysine used in the preparation of the binder composition had a ratio (A:B) of the area of the first peak (A) to the area of the second area (B) of 9:1 in the $^1$H NMR spectrum, a number average molecular weight (Mn) of about 6,000 g/mol, and a weight average molecular weight (Mw) of about 8,000 g/mol which are the same as those of Example 1.

Example 11

A binder composition (solid content of 50 wt % and polylysine:glucose=1:1 w/w) was prepared in the same manner as in Example 1, except that 30 g of L-polylysine and 30 g of glucose were dissolved in 60 g of distilled water.

The polylysine used in the preparation of the binder composition had a ratio (A:B) of the area of the first peak (A) to the area of the second area (B) of 9:1 in the $^1$H NMR spectrum, a number average molecular weight (Mn) of about 6,000 g/mol, and a weight average molecular weight (Mw) of about 8,000 g/mol which are the same as those of Example 1.

Example 12

30 g of DL-polylysine produced by thermal condensation polymerization using DL-lysine as a monomer at 150° C. for 48 hours and 30 g of glucose were dissolved in 60 g of distilled water to prepare a binder composition (solid content of 50 wt % and DL-polylysine:glucose=1:1 w/w).

The polylysine used in the preparation of the binder composition had a ratio (A:B) of the area of the first peak (A) to the area of the second area (B) of 9:1 in the $^1$H NMR spectrum, a number average molecular weight (Mn) of about 6,000 g/mol, and a weight average molecular weight (Mw) of about 8,000 g/mol which are the same as those of Example 1.

Comparative Example 1

100 parts by weight of wood fiber was used without using a binder material.

Comparative Example 2

16.5 g of polylysine and 16.5 g of glucose were dissolved in 33 g of distilled water to prepare a binder composition (solid content of 50 wt % and polylysine:glucose=1:1 w/w).

The polylysine was a mixture of L-polylysine according to Example 1 and a commercially available ε-polylysine (manufactured by Zhengzhou Bainafo Bioengineering Co., Ltd.) and had a ratio (A:B) of the area of the first peak (A) to the area of the second area (B) of 5:5 in the $^1$H NMR spectrum.

Comparative Example 3

18.3 g polylysine and 18.3 g glucose were dissolved in 36.6 g of distilled water to prepare a binder composition (solid content of 50 wt % and polylysine:glucose=1:1 w/w).

The polylysine was a mixture of L-polylysine according to Example 1 and a commercially available ε-polylysine (manufactured by Zhengzhou Bainafo Bioengineering Co., Ltd.) and had a ratio (A:B) of the area of the first peak (A) to the area of the second area (B) of 3:7 in the $^1$H NMR spectrum.

Comparative Example 4

16 g of commercially available ε-polylysine (manufactured by Zhengzhou Bainafo Bioengineering Co., Ltd.) and 16 g of glucose were dissolved in distilled water to prepare a binder composition (solid content of 50 wt %, polylysine:glucose=1:1 w/w).

The polylysine used in the preparation of the binder composition had a ratio (A:B) of the area of the first peak (A) to the area of the second area (B) of 0:10 in the $^1$H NMR spectrum.

Comparative Example 5

A directly manufactured commercially available urea-formaldehyde resin (UF resin) was used as a binder composition.

Comparative Example 6

A commercially available Medium-Density Fiberboard (MDF) (manufactured by Hansol HomeDeco Co., Ltd., interior grade GI 18) was used.

Comparative Example 7

A commercially available MDF (manufactured by Hansol HomeDeco Co., Ltd., superlight grade GSL 18) was used.

Evaluation Example 1: Evaluation According to Composition of Polylysine and Reducing Sugar The following tests were performed to evaluate physical properties according to composition ratios of polylysine to reducing sugar.

a) Evaluation of Water Resistance

Figure 2:
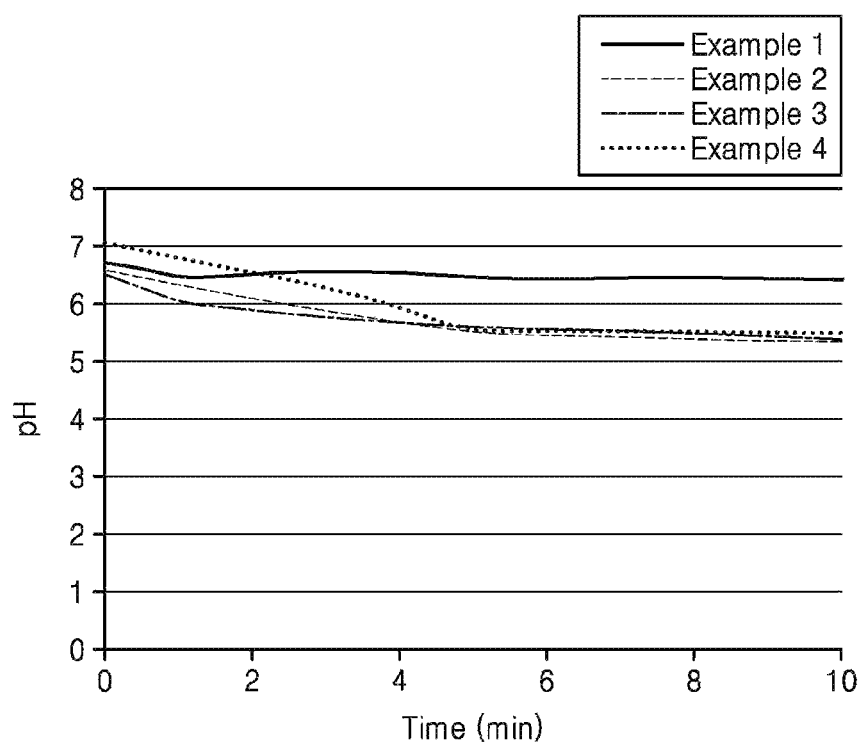
FIG. 2 is a graph illustrating pH changes over time of aqueous solutions including thermosets of binder compositions respectively prepared according to Examples 1 to 4.

Filter paper on which each of the water-insoluble polymers prepared according to Examples 1 to 4 is formed was immersed in distilled water at room temperature for 10 minutes to measure changes of color and pH, and the results are shown in Table 1 and FIG. 2, respectively.

The color change was measured by obtaining APHA values and yellow saturation (b*) using a spectrum colorimeter.

TABLE 1

| | Example | | | |
|---|---|---|---|---|
| | Example 1 | Example 2 | Example 3 | Example 4 |
| APHA | 20 | 84 | 119 | 223 |
| Yellow saturation (b*) | 0.64 | 2.68 | 3.78 | 7.09 |

The smaller the pH changes, the better the water resistance is because a degree of dissolution of the binder composition remaining without curing increases. The smaller the color changes, the better the water resistance is.

Referring to Table 1 and FIG. 2, the pH and color of the water-insoluble polymer obtained using the binder composition according to Example 1, in which the contents of glucose and polylysine are the same, were less changed than those of the water-insoluble polymers obtained using the binder compositions according to Examples 2 to 4, in which the content of glucose was greater than that of polylysine, even after immersion of a certain period of time. Therefore, it was confirmed that the water-insoluble polymer obtained using the binder composition according to Example 1 had better water resistance than the water-insoluble polymers obtained using the binder compositions according to Examples 2 to 4.

Manufacture of Sample

Samples were manufactured using the binder compositions respectively prepared according to Examples 5 to 7.

85 parts by weight of wood fiber (a mixture of Pinus rigida, Pinus radiate, and the like) was mixed with 15 parts by weight of each binder composition to prepare a mixture. The prepared mixture was shaped at a temperature of 160° C. under a pressure of 200 kg/cm$^2$. The shaping was performed by repeating compression for 30 seconds and decompression for 3 minutes twice. Gases generated during curing were removed in the decompression and the sample was cured. The shaped sample was left to stand at 160° C. for 1 hour for curing.

Meanwhile, a sample was manufactured in the same manner using 100 parts by weight of the wood fiber according to Comparative Example 1.

b) Measurement of Flexural Bending Strength, Appearance, and Density

Area and thickness of each of the samples prepared using the binder compositions according to Examples 5 to 7 and the wood fiber according to Comparative Example 1 were measured using a micrometer and flexural bending strength of each sample was measured by compressing the sample at a rate of 50 mm/min at room temperature using a universal testing machine (UTM). The results are shown in Table 2 below. In addition, appearances and densities of the samples and solid contents of the binder compositions used in the preparation of the samples were shown in Table 2, respectively.

TABLE 2

| | | Example | | | |
|---|---|---|---|---|---|
| | | Example 5 | Example 6 | Example 7 | Comparative Example 1 |
| Physical properties of sample | Appearance | reddish brown, opaque | reddish brown, opaque | brown, transparent | — |

TABLE 2-continued

| | Example | | | Comparative Example |
|---|---|---|---|---|
| | Example 5 | Example 6 | Example 7 | Comparative Example 1 |
| Solid content (%) | 50 | 50 | 50 | — |
| Density (kg/m³) | 667 | 741 | 667 | — |
| Flexural bending strength (N/mm²) | 9.72 | 4.40 | 2.50 | 0.34 |

As shown in Table 2, the samples prepared using the binder compositions according to Examples 5 to 7 had significantly increased flexural bending strength, compared to the sample prepared using only the wood fiber according to Comparative Example 1.

Also, it was confirmed that the sample prepared using the binder composition according to Example 5 in which the contents of polylysine and glucose are similar had further increased flexural bending strengths, compared to the samples prepared using the binder compositions according to Examples 6 and 7 in which the contents of polylysine and glucose are different.

Thus, it is considered that as the contents of polylysine and glucose are more similar, curing rates increase, resulting in improvement of water resistance and an increase in strength of the water-insoluble polymer referring to Tables 1 and 2. That is, as the contents of polylysine and glucose become more similar, physical properties of the water-insoluble polymer are further improved.

Evaluation Example 2: Measurement of Physical Properties According to Composition Ratio of Alpha (α):Epsilon (ε) in Polylysine The following tests were performed to evaluate the binders according to composition ratios of α:ε in polylysine according to an embodiment.

Manufacture of Sample

Samples were respectively manufactured using the binder compositions prepared according to Examples 5 and 8 and Comparative Examples 2 to 4.

85 parts by weight of wood fiber (a mixture of Pinus rigida, Pinus radiate, and the like) was mixed with 15 parts by weight of each binder composition to prepare a mixture. The prepared mixture was shaped at a temperature of 160° C. under a pressure of 200 kg/cm². The shaping was performed by repeating each of compression for 30 seconds and decompression for 3 minutes twice. Gases generated during curing were removed by the decompression and the sample was cured. The shaped sample was left to stand at 160° C. for 1 hour for curing.

a) Measurement of Appearance, Density, and Flexural Bending Strength

Area and thickness of each of the samples prepared using the binder compositions according to Examples 5 and 8 and the binder compositions according to Comparative Examples 2 to 4 were measured using a micrometer and flexural bending strength of each sample was measured by compressing the sample at a rate of 50 mm/min at room temperature using a universal testing machine (UTM). The results are shown in Table 3 below. In addition, appearances and densities of the samples and solid contents of the binder compositions used in the samples were shown in Table 3, respectively.

b) Measurement of Curing Temperature

Curing temperature was measured using a rotational rheometer (manufactured by Anton Paar Physica). Each sample was located between parallel plates separated by a 0.5 mm gap, and one of the parallel plates was rotated with a constant shear rate of $1.0 \text{ s}^{-1}$ while increasing temperature at a rate of 2° C./min in a temperature range of 30 to 160° C. Curing temperature was measured based on behaviors of materials of each sample and the results are shown in Table 3 below.

c) Measurement of Thickness Expansion Rate

Area and thickness of each of the samples prepared using the binder compositions according to Examples 5 and 8 and the binder compositions according to Comparative Examples 2 to 4 were measured using a micrometer. After immersing the sample in a beaker filled with distilled water for 24 hours, thickness change of each sample was measured and the results are shown in Table 3 below. A thickness expansion rate was calculated using Equation 1 below.

$$\text{Thickness expansion rate (\%)} = [T-T_0]/T_0 \times 100 \quad \text{Equation 1}$$

In Equation 1, T is thickness of sample after immersion for 24 hours and $T_0$ is initial thickness of the sample.

d) Measurement of Water Absorption Rate

Weight of each of the samples prepared using the binder compositions according to Example 5 and Comparative Examples 2 to 4 was measured. After immersing the sample in a beaker filled with distilled water for 24 hours, weight change of each sample was measured. Distilled water was maintained at room temperature and moisture content was measured immediately after removing moisture of the surface from the sample taken out of the beaker. The water absorption rate was calculated using Equation 2 below.

$$\text{Water absorption rate (\%)} = [W-W_0]/W_0 \times 100 \quad \text{Equation 2}$$

In Equation 2, W is thickness of sample after immersion for 24 hours, and $W_0$ is initial thickness of the sample.

TABLE 3

| | Example | Example 5 | Example 8 | Comparative Example 2 | Comparative Example 3 | Comparative Example 4 |
|---|---|---|---|---|---|---|
| Physical properties of sample | Appearance | reddish brown, opaque | reddish brown, transparent | reddish brown, transparent | brown, transparent | yellow, transparent |
| | Density (kg/m³) | 667 | 667 | 667 | 500 | 571 |
| | Flexural bending strength (N/mm²) | 9.72 | 6.71 | 5.91 | 3.76 | 3.29 |

TABLE 3-continued

| Example | Example 5 | Example 8 | Comparative Example 2 | Comparative Example 3 | Comparative Example 4 |
|---|---|---|---|---|---|
| Curing temperature (° C.) | 116.37 | 117.94 | 118.35 | 119.56 | 129.44 |
| Thickness expansion rate (%) | 51.28 | 55.34 | 75.06 | 80.89 | 86.67 |

As shown in Table 3, as the content of alpha (α) increases in the composition ratio of alpha (α):epsilon (ε) in polylysine, physical properties of a thermosets of a binder composition were further improved. It was confirmed that the samples according to Examples 5 and 8 had lower curing temperatures and higher flexural bending strengths than the samples according to Comparative Examples 2 to 4. Therefore, it is considered that as the content of alpha (α) increases in polylysine, curing may start at a lower temperature and flexural bending strength is improved due to an increased degree of curing.

Also, as a result of measuring water absorption rates of the samples according to Example 5 and Comparative Examples 2 to 4, the water absorption rate of the sample according to Example 5 was 93.54%, while the water absorption rates of the samples according to Comparative Examples 2 to 4 were 276.36%, 281.23%, and 285.36%, respectively. That is, it was confirmed that as α-bond increases in polylysine, the water absorption rate decreases.

Evaluation Example 3: Measurement of Physical Properties According to Types of Reducing Sugar The following tests were performed to evaluate physical properties of binders according to types of the reducing sugar.

Manufacture of Sample

After each of the binder compositions prepared according to Examples 9 to 11 was mixed with wood fiber in an amount of 64.7 kg per m³ of the wood fiber, the mixture was press-cured under temperature condition of 220° C. for several seconds to prepare a medium-density fiberboard (MDF) sample. That is, 64.7 kg of each binder composition per 1 m³ of the wood fiber was used.

An MDF sample according to Comparative Example 5 was prepared in the same manner as in Example 8, except that a commercially available UF resin was used.

Measurement of Physical Properties of MDF

Physical properties of the MDF samples manufactured respectively using the binder compositions according to Examples 9 to 11 and Comparative Example 5 were measured according to the Korean Industrial Standard (KSF3200) for wood and MDF, and the results are shown in Table 4 below.

TABLE 4

| | | Example | | | |
|---|---|---|---|---|---|
| | | Example 9 | Example 10 | Example 11 | Comparative Example 5 |
| Physical properties of sample | Appearance | reddish brown | reddish brown | reddish brown | ivory white |
| | Density (kg/m³) | 717 | 709 | 802 | 740 |
| | Thickness (mm) | 3.03 | 2.98 | 2.87 | 2.74 |
| | Internal bond strength (N/mm²) | 1.72 | 2.04 | 2.4 | 1.3 |
| | Thickness expansion rate (%) | 38 | 32.8 | 30 | 40 |

As shown in Table 4, the MDF samples respectively prepared using the binder compositions according to Examples 9 to 11 had increased internal bond strengths and decreased thickness expansion rates than the MDF manufacturing using the commercially available resin according to Comparative Example 5.

The binder composition including glucose according to Example 11 had increased internal bond strength and decreased thickness expansion rate after the samples were manufactured, compared to the binder composition including xylose according to Example 10. Thus, it was confirmed that physical properties were further improved in the binder composition of Example 11.

Evaluation Example 4: Measurement of Physical Properties According to Types of Polylysine The following tests were performed to evaluate binders according to types of polylysine.

Manufacture of Sample

Samples were manufactured respectively using the binder compositions according to Examples 11 to 12 and Comparative Example 5.

85 parts by weight of wood fiber (a mixture of Pinus rigida, Pinus radiate, and the like) was mixed with 15 parts by weight of each binder composition to prepare a mixture. The prepared mixture was shaped at a temperature of 160° C. under a pressure of 200 kg/cm². The shaping of the sample was performed by repeating each of compression for 30 seconds and decompression for 3 minutes twice. Gases generated during curing were removed by the decompression and the sample was cured. The shaped sample was left to stand at 160° C. for 1 hour for curing.

An MDF sample according to Comparative Example 5 was prepared in the same manner as in Example 11, except that a commercially available UF resin was used.

Measurement of Physical Properties of MDF

Physical properties of the MDF samples manufactured respectively using the binder compositions according to Examples 11 and 12 and comparative Example 5 and commercially available MDF samples according to Comparative Examples 6 and 7 were measured according to the Korean Industrial Standard (KSF3200) for wood and MDF, and the results are shown in Table 5 below.

Methods of measuring physical properties are the same as those described above with reference to Table 3.

TABLE 5

|  | Example | Example 11 | Example 12 | Comparative Example 5 | Comparative Example 6 | Comparative Example 7 |
|---|---|---|---|---|---|---|
| Physical properties of sample | Density (kg/m$^3$) | 840 | 790 | 770 | 630 | 620 |
|  | Flexural bending strength (MPa) | 27.9 | 27.3 | 29.1 | 26.5 | 25.2 |
|  | Internal bond strength (MPa) | 0.36 | 0.48 | 0.28 | 0.18 | 0.59 |
|  | Thickness expansion rate (%) | 38.9 | 11.9 | 47.1 | 9.3 | 45.6 |
|  | Water absorption rate (%) | 1.67 | 1.00 | 2.96 | 6.38 | 4.76 |

Referring to Table 5, the MDF samples manufactured respectively using the binder compositions according to Examples 11 and 12 had increased internal bond strengths while providing similar flexural bending strengths, and reduced thickness expansion rates and decreased water absorption rates indicating improvement of water resistance, when compared to the MDF sample manufactured using the commercially available resin according to Comparative Example 5.

Also, the MDF samples according to Examples 11 and 12 had increased flexural bending strengths and reduced water absorption rates, when compared to the commercially available MDF samples according to Comparative Examples 6 and 7, and thus it was confirmed that physical properties were further improved.

In addition, when Example 11 is compared with Example 12, it was confirmed that DL-polylysine polymerized using DL-lysine as a monomer has better water resistance than L-polylysine polymerized using only L-lysine as a monomer.

INDUSTRIAL APPLICABILITY

The binder composition according to the present disclosure may have increased strength and water resistance after thermal curing.

The invention claimed is:

1. A binder composition comprising:
   polylysine; and
   at least one reducing sugar or a derivative thereof,
   wherein the polylysine exhibits, in a $^1$H NMR spectrum, a first peak at 3.2 ppm to 3.4 ppm and a second peak at 3.8 ppm to 4.0 ppm, wherein a ratio (A:B) of an area of the first peak (A) to an area of the second peak (B) is 70:30 to 98:2.

2. The binder composition of claim 1, wherein a content of the polylysine is 15 to 60 parts by weight based on 100 parts by weight of the solid content of the binder composition.

3. The binder composition of claim 1, wherein a molecular weight of the polylysine is 4,000 g/mol or greater.

4. The binder composition of claim 1, wherein the polylysine is a condensation polymer of at least one selected from L-lysine and DL-lysine.

5. The binder composition of claim 1, wherein the polylysine is a product of condensation polymerization of lysine performed for 6 to 48 hours at a temperature of 130° C. to 150° C.

6. The binder composition of claim 1, wherein the reducing sugar comprises at least one group selected from an aldehyde group and a ketone group.

7. The binder composition of claim 1, wherein a content of the reducing sugar or a derivative thereof is 40 to 60 parts by weight based on 100 parts by weight of the solid content of the binder composition.

8. The binder composition of claim 1, wherein the reducing sugar is glucose, xylose, or any combination thereof.

9. The binder composition of claim 1, wherein the solid content of the binder composition is 15 to 80 parts by weight based on 100 parts by weight of the binder composition.

10. An article cemented by a thermoset of the binder composition according to claim 1.

11. A method of manufacturing an article, the method comprising:
    preparing the binder composition according to claim 1; and
    thermally curing the binder composition at a temperature of 120° C. or higher.

12. The method of claim 11, wherein the binder composition further comprises at least one selected from a fibrous material and a powdered material.

* * * * *